United States Patent
Li et al.

(10) Patent No.: US 9,052,420 B2
(45) Date of Patent: Jun. 9, 2015

(54) BACKLIGHT LED STRUCTURE, BACKLIGHT AND DISPLAY DEVICE

(71) Applicants: BOE Technology Group Co., Ltd., Beijing (CN); Beijing BOE Display Technology Co., Ltd., Beijing (CN)

(72) Inventors: You Li, Beijing (CN); Xiuyun Chen, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 70 days.

(21) Appl. No.: 14/082,970

(22) Filed: Nov. 18, 2013

(65) Prior Publication Data

US 2014/0146565 A1 May 29, 2014

(30) Foreign Application Priority Data

Nov. 27, 2012 (CN) .......................... 2012 1 0492604

(51) Int. Cl.
*G02B 6/26* (2006.01)
*F21V 8/00* (2006.01)
*G02B 6/00* (2006.01)

(52) U.S. Cl.
CPC ............ *G02B 6/0023* (2013.01); *G02B 6/0031* (2013.01); *G02B 6/0068* (2013.01); *G02B 6/0091* (2013.01)

(58) Field of Classification Search
CPC .. G02B 6/0011; G02B 6/0013; G02B 6/0015; G02B 6/0016; G02B 6/0018; G02B 6/002; G02B 6/0023; G02B 6/0025; G02B 6/0028; G02B 6/0031; G02B 6/0068; G02B 6/0091; F21K 9/52; F21V 2200/20

USPC .................................................. 362/606–612
See application file for complete search history.

(56) References Cited

U.S. PATENT DOCUMENTS 7,448,783 B2 * 11/2008 Ohkawa .................... 362/555
2007/0058392 A1 3/2007 Watanabe et al.
(Continued)

FOREIGN PATENT DOCUMENTS

CN 1742179 A 3/2006
CN 201521863 U 7/2010
(Continued)

OTHER PUBLICATIONS

Office action and search report from Chinese Patent Office for priority application 201210492604.3 dated Jun. 5, 2014.
(Continued)

*Primary Examiner* — Karabi Guharay
*Assistant Examiner* — Nathaniel Lee
(74) *Attorney, Agent, or Firm* — Frommer Lawrence & Haug LLP; Ronald R. Santucci

(57) ABSTRACT

The present invention discloses a backlight LED structure, a backlight and a display device. In the backlight LED structure, a flange structure is arranged at the upper side of an LED bracket which is defined when the LED bracket is mounted close to a light guide plate such that the flange structure covers the upper side of the light guide plate when the LED structure and the light guide plate are assembled. In addition, each of the two ends of the flange structure has an angular area extending outwards, and the lower surfaces of the two angular areas are distributed with light guide points. The backlight LED structure can prevent the LED light from being emitted from the fitting gap between the backlight LED structure and the light guide plate, and control direction of light between the backlight LED structures and scatter travel direction of the light.

20 Claims, 3 Drawing Sheets

(56) References Cited

U.S. PATENT DOCUMENTS

2009/0051852 A1* 2/2009 Chen et al. .................. 349/65
2010/0328580 A1 12/2010 Kim
2014/0002771 A1* 1/2014 Huang et al. ................ 349/64

FOREIGN PATENT DOCUMENTS

| CN | 202209594 U | 5/2012 |
|----|-------------|--------|
| CN | 102767762 A | 11/2012 |
| EP | 1 746 666 A | 1/2007 |
| JP | 2003-242817 A | 8/2003 |
| TW | I280427 B | 5/2007 |

OTHER PUBLICATIONS

Notification of Second Office action from Chinese Patent Office for priority application 201210492604.3 dated Jan. 26, 2015 with English translation.

* cited by examiner

BACKLIGHT LED STRUCTURE, BACKLIGHT AND DISPLAY DEVICE

TECHNICAL FIELD

The present invention relates to a liquid crystal display, and particularly to a backlight LED structure, a backlight and a display device.

BACKGROUND ART

Since liquid crystal itself does not emit light, in various liquid crystal display (hereinafter referred to as "LCD") devices such as liquid crystal display and liquid crystal television, external light sources are required to implement display. The light emitting diode (hereinafter referred to as "LED") backlight has become the mainstream backlight at present as it has the advantages of good coloring characteristics, long service life, mercury free and environmental protection, and the like.

LED backlight can be divided into two types: a side-edge type LED backlight and a direct type LED backlight according to the distribution position of LED. The side-edge type LED backlight is widely used in LCDs with middle and small sizes due to its advantages of less LEDs required, low cost and thinness. FIG. 1 illustrates a partial sectional view of side-edge type LED backlight, which includes a backboard 1, a light guide plate 2 and an optical film 3, as well as backlight LED structures 10 located at two sides of the light guide plate 2 (only one side is shown in FIG. 1), and further includes a glue frame 4 for fixing the backlight, and a display panel 6 is arranged above the backlight. Wherein, as shown in FIG. 3, the backlight LED structure 10 includes an LED bracket 20 and an LED chip 7 fixed on the LED bracket 20. The backlight LED structures 10 are fixed at two sides of the light guide plate 2 through a lamp strip 30 with a certain fitting gap guaranteed.

However, at present, bright spots or bright lines appearing at two sides of the display panel 6 are bad phenomenon frequently occurring in side-edge type LED backlight. The occurrence mechanism is shown in following FIG. 2, as the light emitting angle of LED is generally about 120° and there is a certain gap between backlight LED structures 5, this results in a dark area W without light illuminating generated near the light incident surface of the light guide plate 2, and therefore bright spots or bright lines appear at the two sides of the display panel 6. Measures for solving bright spots or bright lines appearing on the display panel 6 at present are as following:

1. The length of the glue frame 4 is increased to shield the bright spots or bright lines at the two sides of the display panel, however, this goes against implementation of narrow frame design of LCD;

2. Reflective sheets are pasted at the two sides of the optical film 3 for shielding, however, this may add assembly parts, and the assembling may be complex.

3. The gap between the LED structure and the light guide plate 2 is increased to achieve light mixing distance, however, this may loss luminous efficacy.

SUMMARY OF THE INVENTION

The prevent invention provides a backlight LED structure, a backlight and a display device for solving the problem of bright spots or bright lines that appear at two sides of display panel due to illumination dark areas exist in the backlight LED structure, meanwhile, it can also guarantee luminous efficacy of the LED structure, does not add new assembly parts, and does not affect the narrow frame design of the LCD.

To solve the above technical problem, the present invention provides a backlight LED structure comprising an LED bracket and an LED chip fixed on the LED bracket, wherein the LED bracket has a flange structure such that the flange structure covers the upper side of a light guide plate when the backlight LED structure and the light guide plate are assembled, for shielding LED light from being emitted from a fitting gap between the backlight LED structure and the light guide plate; wherein the flange structure has angular areas extending outwards; and lower surfaces of the angular areas are distributed with light guide points for controlling direction of light between the LED structures.

The backlight LED structure as described above, preferably, each of two ends of the flange structure has the angular area extending outwards.

The backlight LED structure as described above, preferably, the two angular areas are located at the top of the two ends of the flange structure respectively.

The backlight LED structure as described above, preferably, the two angular areas are located at the bottom of the two ends of the flange structure respectively.

The backlight LED structure as described above, preferably, the two angular areas are located at the middle of the two ends of the flange structure respectively.

The backlight LED structure as described above, preferably, the flange structure is level with the upper surface of the LED bracket.

The backlight LED structure as described above, preferably, the flange structure protrudes from the upper surface of the LED bracket.

The present invention further provides a backlight including the above-described backlight LED structure.

At the same time, the present invention also provides a display device including the above-described backlight.

In the backlight LED structure, the backlight and the display device provided in the present invention, a flange structure is arranged at the upper side of the LED bracket which is defined when the LED bracket is mounted close to the light guide plate, such that the flange structure covers the upper side of the light guide plate when the LED structure and the light guide plate are assembled. In addition, each of the two ends of the flange structure has an angular area extending outwards, and the lower surfaces of the two angular areas are distributed with light guide points. The backlight LED structure not only can prevent the LED light from being emitted from the fitting gap between the backlight LED structure and the light guide plate, which has certain shielding function, but also can control direction of light between the backlight LED structures and scatter travel direction of light under the reflecting and scattering effect of the light guide points, which avoids illumination dark area and effectively prevents bright spots or bright lines from appearing at two sides of the display panel.

DETAILED DESCRIPTION OF EMBODIMENTS

Specific embodiments of the present invention will be described in detail with reference to the figures. The following embodiments are used for explaining the present invention but not for limiting the scope of the present invention.

Figure 1:
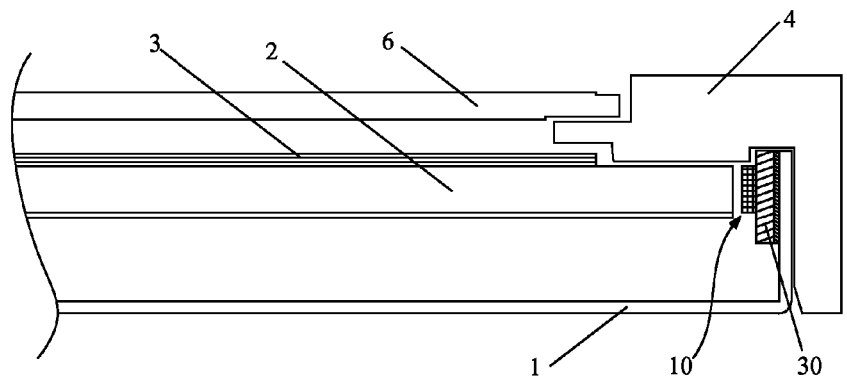
FIG. 1 is a partial sectional view of the backlight in the prior art.

It should be noted that except for specific designation, the terms for describing the positional relation between the light guide plate and the backlight LED structure in the following description are based on the positional relation as shown in FIG. 1, for example, in FIG. 1, the display panel 6 is above the light guide plate 2 and the backlight LED structure 10, the overall light emitting direction of the backlight LED structure 10 is transversal or horizontal. In addition, the space terms for only describing the backlight LED structure use the positioning direction shown in FIG. 4 as the reference direction, for example, in FIG. 4, the overall light emitting direction of the LED chip 7 is upward, the flange structure 9 is above the LED chip 7. The terms such as "upper side", "upper surface", "lower surface" are only for describing convenience, and they are not a limitation. The terms about the position may change based on the reference position and direction.

<Embodiment of the Backlight LED Structure>

Figure 4:
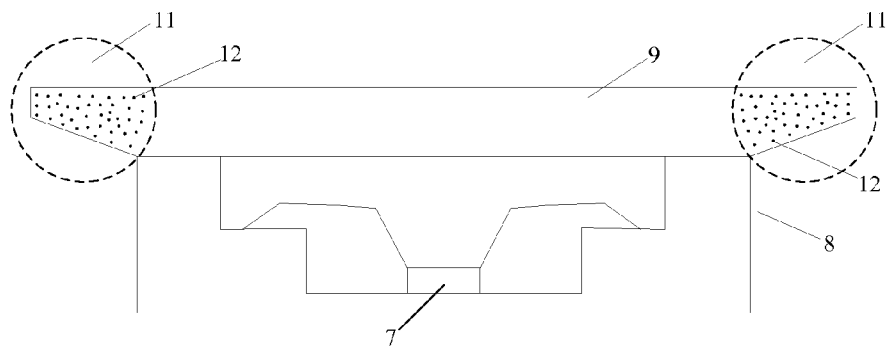
FIG. 4 is the sectional view of a first backlight LED structure according to the embodiment of the present invention.

FIG. 4 shows a sectional view of the backlight LED structure according to the embodiment of the present invention. As shown in FIG. 4, the backlight LED structure in this embodiment of the present invention includes an LED bracket 8 (hereinafter referred to as "bracket") and an LED chip 7 fixed on the bracket 8, the bracket 8 is generally made of a resin material such as PPA, PCT etc., the LED chip 7 has an LED lamp and a related drive circuit thereon. In the backlight LED structure, the bracket 8 has a flange structure 9 arranged at the upper side (upward direction in FIG. 1) of the backlight LED structure, such that the flange structure 9 covers the upper side (i.e., the upward direction in FIG. 1) of the light guide plate 2 when the backlight LED structure and the light guide plate 2 are assembled. The upper side of the backlight LED structure is defined when the backlight LED structure is mounted close to the light guide plate 2. In addition, in FIG. 4, each of the two ends of the flange structure 9 has an angular area 11 extending outwards, and light guide points 12 are distributed on the lower surfaces of the two angular areas 11, thereby preventing LED light from being emitted from the fitting gap between the backlight LED structure 5 and the light guide plate 2, which has certain shielding function, and also controlling direction of light between the backlight LED structures 5 and scattering travel direction of light under the reflecting and scattering effect of the light guide points 12 (in combination with FIG. 6), which avoids illumination dark area and effectively prevents bright spots or bright lines from appearing at two sides of the display panel 6.

Figure 5:
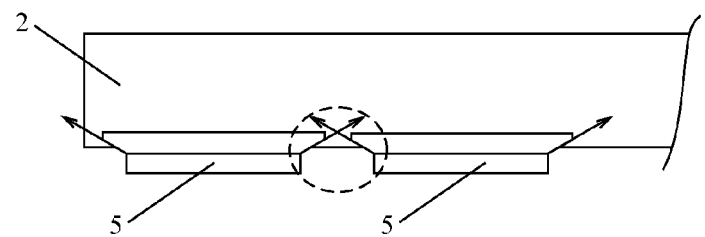
FIG. 5 is a schematic view of light path of the backlight LED structure according to the embodiment of the present invention.

In FIG. 5, the flange structure 9 covers the upper side (outward direction perpendicular to the paper surface is the upward direction) of the light guide plate 2 when the backlight LED structure 5 and the light guide plate 2 are assembled, and the flange structure 9 can be level with the upper surface of the bracket 8, or protrude from the upper surface of the bracket 8, as long as the LED light can be shielded as much as possible from being emitted from the fitting gap after the backlight LED structure 5 and the light guide plate 2 are assembled. Wherein, the upper surface of the bracket 8 is the surface of the bracket 8 of the backlight LED structure 5 as seen in FIG. 5, and is the rear side surface of the bracket 8 in FIG. 4.

As shown in FIG. 4, the two angular areas 11 of the flange structure 9 can be located at top of the two ends of the flange structure 9 respectively.

Figure 2:
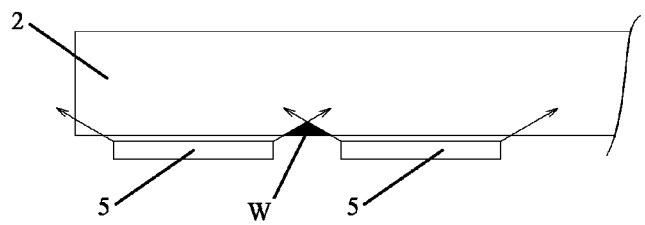
FIG. 2 is a schematic view of light path of the backlight LED structure in FIG. 1.
Figure 3:
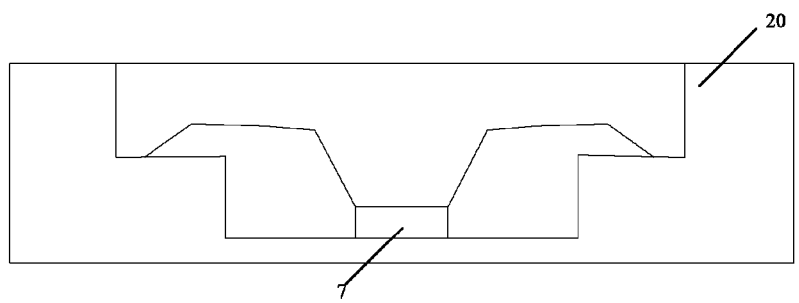
FIG. 3 is a sectional view of the backlight LED structure in FIG. 1.
Figure 6:
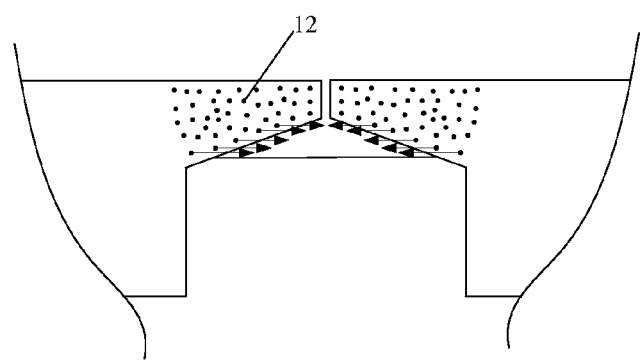
FIG. 6 is a partial enlarged view of the part within the dashed box in FIG. 5.

In combination with FIGS. 5 and 6, when the light of the LED lamp is emitted onto the lower surfaces (outward direction perpendicular to the paper surface is the upward direction) of the angular areas 11, the travel direction of the light is scattered after the light is reflected and scattered by the light guide points 12, such that there is light illuminating the illumination dark area W (as shown in FIG. 2) between the backlight LED structures 5, so as to prevent bright spots or bright lines from appearing at the two sides of the display panel 6.

Figure 7:
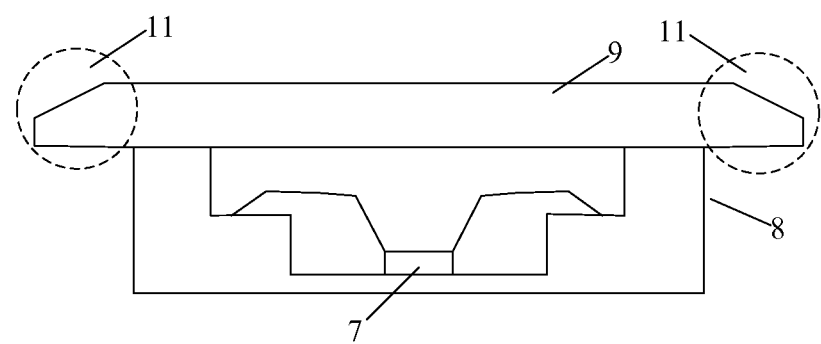
FIG. 7 is the sectional view of a second backlight LED structure according to the embodiment of the present invention.
Figure 8:
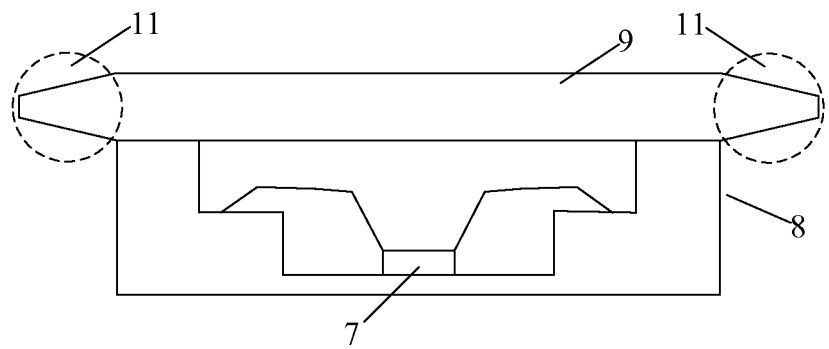
FIG. 8 is the sectional view of a third backlight LED structure according to the embodiment of the present invention.

The two angular areas 11 of the flange structure 9 in the present embodiment may also be located at the bottom of the two ends of the flange structure 9 respectively, as shown in FIG. 7. The two angular areas 11 of the flange structure 9 in the present embodiment may also be located at the middle of the two ends of the flange structure 9 respectively, as shown in FIG. 8. The two angular areas 11 of the flange structure 9 may also be such located that one is at the top of one end of the flange structure 9 and the other is at the bottom or middle of the other end of the flange structure 9, or one is at the bottom of one end of the flange structure 9 and the other is at the middle of the other end of the flange structure 9, all these belong to protection scope of the present invention, and their specific working principles are the same.

<Embodiment of the Backlight>

The embodiment of the present invention provides a backlight, which includes the backlight LED structure in the above embodiment. The backlight would not cause illumination dark area near the incident surface at two sides of the light guide plate, and thus guaranteeing good quality of the backlight.

<Embodiment of the Display Device>

The embodiment of the present invention provides a display device, which includes the backlight in the above embodiment, such that bright spots or bright lines would not appear at the two sides of the display panel of the display device, which increases the display quality and can realize narrow frame design of the display device.

From the above embodiments it can be seen that, in the backlight LED structure, the backlight and the display device provided in the present invention, a flange structure is arranged at the upper side of the LED bracket when the LED bracket is mounted close to the light guide plate, such that the flange structure covers the upper side of the light guide plate when the LED structure and the light guide plate are assembled. In addition, each of the two ends of the flange structure has an angular area extending outwards, and the lower surfaces of the two angular areas are distributed with light guide points. The backlight LED structure according to the embodiments of the present invention not only can prevent the LED light from being emitted from the fitting gap between the backlight LED structure and the light guide plate, which has certain shielding function, but also can control direction of light between the backlight LED structures and scatter travel direction of light under the reflecting and scattering effect of the light guide points, which avoids illumination dark area and effectively prevents bright spots or bright lines from appearing at two sides of the display panel.

The above are only the preferred embodiments of the present invention, it should be pointed out that for the skilled person in the art, various improvements and replacements can also be made without departing from the technical principle of the present invention, and these improvements and replacements should also belong to the protection scope of the present invention.

What is claimed is:

1. A backlight LED structure comprising an LED bracket and an LED chip fixed on the LED bracket, wherein the LED bracket has a flange structure such that the flange structure covers the upper side of a light guide plate when the backlight LED structure and the light guide plate are assembled, the flange structure is used for shielding LED light from being emitted from the fitting gap between the backlight LED structure and the light guide plate; wherein the flange structure has angular areas extending outwards; and the lower surfaces of the angular areas are distributed with light guide points for controlling direction of light between the LED structures.

2. The backlight LED structure as claimed in claim 1, wherein each of two ends of the flange structure has the angular area extending outwards.

3. The backlight LED structure as claimed in claim 2, wherein the two angular areas are located at the top of the two ends of the flange structure respectively.

4. The backlight LED structure as claimed in claim 2, wherein the two angular areas are located at the bottom of the two ends of the flange structure respectively.

5. The backlight LED structure as claimed in claim 2, wherein the two angular areas are located at the middle of the two ends of the flange structure respectively.

6. The backlight LED structure as claimed in claim 1, wherein the flange structure is level with the upper surface of the LED bracket.

7. The backlight LED structure as claimed in claim 1, wherein the flange structure protrudes from the upper surface of the LED bracket.

8. A backlight, including a backlight LED structure, wherein the backlight LED structure comprises an LED bracket and an LED chip fixed on the LED bracket, the LED bracket has a flange structure such that the flange structure covers the upper side of a light guide plate when the backlight LED structure and the light guide plate are assembled, the flange structure is used for shielding LED light from being emitted from the fitting gap between the backlight LED structure and the light guide plate; wherein the flange structure has angular areas extending outwards; and the lower surfaces of the angular areas are distributed with light guide points for controlling direction of light between the LED structures.

9. The backlight as claimed in claim 8, wherein each of two ends of the flange structure has the angular area extending outwards.

10. The backlight as claimed in claim 9, wherein the two angular areas are located at the top of the two ends of the flange structure respectively.

11. The backlight as claimed in claim 9, wherein the two angular areas are located at the bottom of the two ends of the flange structure respectively.

12. The backlight as claimed in claim 9, wherein the two angular areas are located at the middle of the two ends of the flange structure respectively.

13. The backlight as claimed in claim 8, wherein the flange structure is level with the upper surface of the LED bracket.

14. The backlight as claimed in claim 8, wherein the flange structure protrudes from the upper surface of the LED bracket.

15. A display device, including a backlight, wherein the backlight includes a backlight LED structure, the backlight LED structure comprises an LED bracket and an LED chip fixed on the LED bracket, the LED bracket has a flange structure such that the flange structure covers the upper side of a light guide plate when the backlight LED structure and the light guide plate are assembled, the flange structure is used for shielding LED light from being emitted from the fitting gap between the backlight LED structure and the light guide plate; wherein the flange structure has angular areas extending outwards; and the lower surfaces of the angular areas are distributed with light guide points for controlling direction of light between the LED structures.

16. The display device as claimed in claim 15, wherein two angular areas are located at the top of two ends of the flange structure respectively.

17. The display device as claimed in claim 15, wherein two angular areas are located at the bottom of two ends of the flange structure respectively.

18. The display device as claimed in claim 15, wherein two angular areas are located at the middle of two ends of the flange structure respectively.

19. The display device as claimed in claim 15, wherein the flange structure is level with the upper surface of the LED bracket.

20. The display device as claimed in claim 15, wherein the flange structure protrudes from the upper surface of the LED bracket.

* * * * *